May 3, 1932. C. A. MAYER 1,856,774
LOUD SPEAKER CONSTRUCTION
Filed Nov. 15, 1930
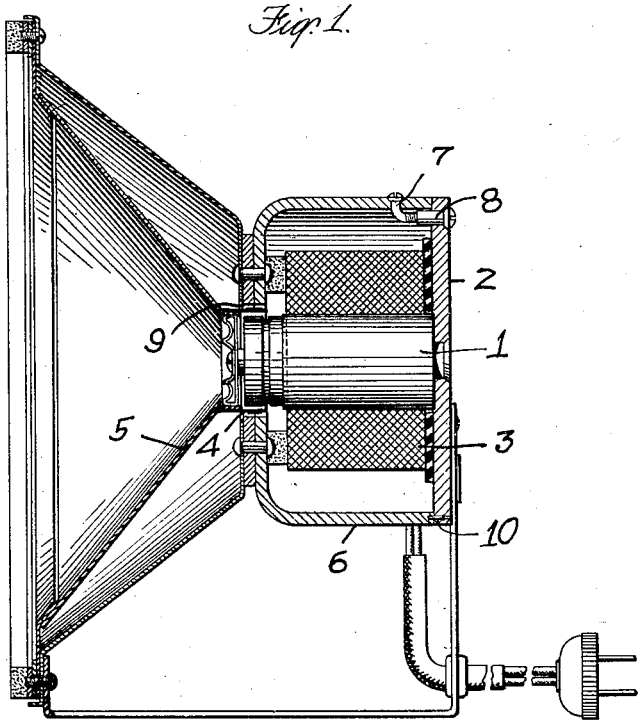
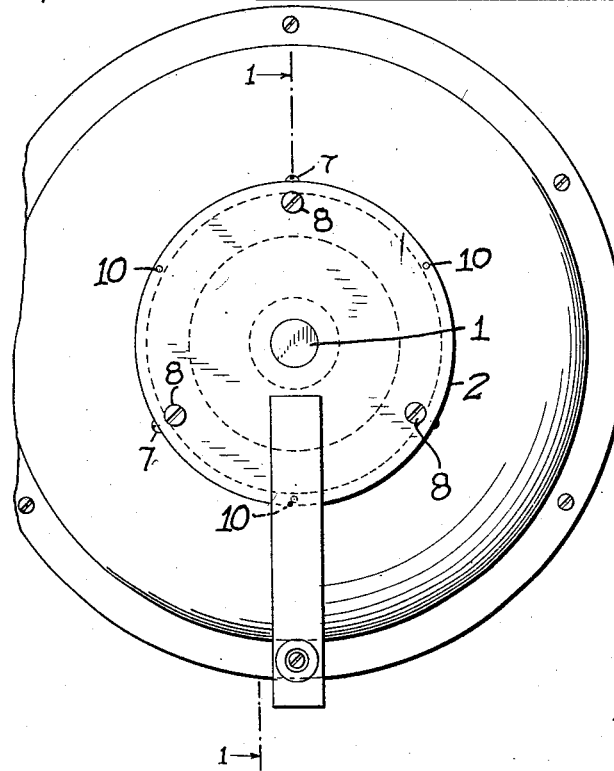
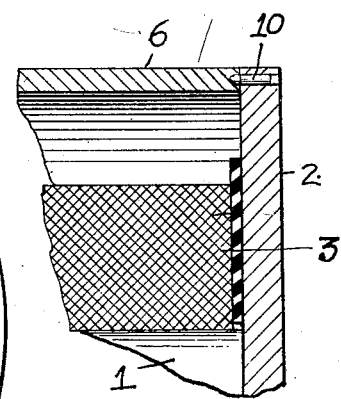
INVENTOR
Carl A. Mayer
BY
ATTORNEY Patented May 3, 1932

1,856,774

UNITED STATES PATENT OFFICE

CARL A. MAYER, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK

LOUD SPEAKER CONSTRUCTION

Application filed November 15, 1930. Serial No. 495,841.

This invention relates to dynamic speakers, and has for its object the provision of a simple and efficient method of centering and means for keeping the field core thereof in its centered position.

The invention comprises first adjusting the field core in its centered position by means of a suitable temporary gauge and thence securing the base plate to the casing of the speaker by means of dowel pins whilst the field core is being held in its centered position by said gauge. When the dowel pins have been firmly secured as by staking, the gauge is removed and it will be found that the field core will remain accurately centered without the aid of a centering or locating ring, and will not become decentered subsequently by vibration or ordinary mechanical shock.

It will be found further that thereby there is also provided a convenient means for subsequently recentering the field core should it become necessary to do so, without the aid of a gauge, because the holes in the base plate and casing made by the dowel pins provides its own gauge or template.

The accompanying drawings illustrate my invention.

Fig. 1 is a vertical section of a speaker embodying my invention; Fig. 2 is a detail; and Fig. 3 is a rear elevation of Fig. 1.

The speaker comprises a field core 1 rigidly mounted on a base plate 2 and having a magnetizing field coil 3. Mounted on the field core is a moving coil 4 to which is attached a diaphragm 5.

The base plate is attached to a housing 6 by means of the spokes 7 and nipples 8.

The field core is accurately centered with respect to the aperture 9 in the housing through the medium of a suitable gauge (not shown). The opposite end of the housing which receives the closure plate 2 is open. Dowel pins 10 are then forced through the base plate into the housing and staked, as clearly shown, at a number of points around the edge of the plate and housing. The gauge is removed when the base plate has been attached to the housing in the manner desired.

It will be apparent that the bent screws 7 and fastening elements 8, while they are sufficient to hold the plate 2 so as to mount the core 1 in approximately central position, are nevertheless incapable of supporting the core 1 in the exact location required. Also these parts will permit a slight degree of movement of the plate 2; hence after the plate has been mounted on the housing 6, the operation of centering the core 1 is carried out by moving the plate and the core 1 into the precise locations desired and then the dowel pins are forced into place to maintain the parts in this relation.

This will keep the base plate immovably fixed to the housing. Should it be necessary subsequently to disassemble the speaker, the base plate may be pried away from the housing by a suitable tool, and in reassembling the speaker it will not be necessary to employ the centering gauge again because the dowel pin holes in the base plate and housing serve to properly aline the field core with respect to the opening in the housing so that the field core will be automatically correctly centered.

Having described my invention, what I claim is:

1. In a dynamic speaker, a base plate, a field core rigidly mounted thereon, a housing having one end open and an aperture in the opposite end into which said core projects when the closure plate is attached to the open end of the housing, means for connecting the closure plate to the rim of the housing while permitting a slight degree of adjustment of the closure plate to center the core in said aperture, and means engaging the closure plate and the rim of the housing to affix said plate in position to maintain the core in exact central position with respect to the aperture, said means and their points of engagement with the housing indicating the true position to be assumed by the plate to center the core when the plate and core are replaced after removal.

2. In a dynamic speaker, a base plate, a field core rigidly mounted thereon, a housing having one end open and an aperture in the opposite end to receive the end of the core, means comprising bent screws attached to the housing and fastening elements carried by the plate to connect the plate to the housing and close the open end thereof, said means permitting a slight degree of adjustment of the plate to bring the core in exact central position with respect to the aperture, and dowel pins passing through the plate into engagement with the rim of the core at the open end to enable the plate to maintain the core in said central position, said pins and their points of engagement with the housing marking the true position to be assumed by the plate for again centering the core when the plate and core are replaced after removal.

3. In a dynamic speaker construction embracing a housing open at one end and having an aperture at the other end, a closure plate for the opening and a field core rigidly secured to said plate, the method of mounting the core which includes inserting the end of the core into the aperture and connecting the closure plate to the rim of the housing at the open end, adjusting the plate without disconnecting same to center said core in said aperture and then forcing dowel pins through the plate into engagement with the rim of the housing to hold said core in exact central position with respect to the aperture, said pins and the points of engagement thereof with the housing marking the correct position of the plate and core when the same are replaced after removal.

In testimony whereof I affix my signature.

CARL A. MAYER.